(12) United States Patent
De Wit et al.

(10) Patent No.: US 7,793,901 B2
(45) Date of Patent: Sep. 14, 2010

(54) MULTIFUNCTIONAL MOUNTING BRACKET FOR AN ELECTRICAL DEVICE

(75) Inventors: Ruud De Wit, Geertruidenberg (NL); Ko Van Bruinessen, Breda (NL)

(73) Assignee: Robert Bosch GmbH, Stuttgart (DE)

( * ) Notice: Subject to any disclaimer, the term of this patent is extended or adjusted under 35 U.S.C. 154(b) by 824 days.

(21) Appl. No.: 11/583,879

(22) Filed: Oct. 19, 2006

(65) Prior Publication Data

US 2008/0048076 A1 Feb. 28, 2008

(30) Foreign Application Priority Data

Oct. 20, 2005 (EP) .................................. 05109801

(51) Int. Cl.
*A47F 5/00* (2006.01)
(52) U.S. Cl. ...................................... 248/207; 248/300
(58) Field of Classification Search ................ 248/207, 248/300, 309.1
See application file for complete search history.

(56) References Cited

U.S. PATENT DOCUMENTS

| | | | | |
|---|---|---|---|---|
| 1,764,071 A | * | 6/1930 | Foulke | ........................ 174/148 |
| 4,113,217 A | | 9/1978 | O'Connell | |
| 4,441,684 A | * | 4/1984 | Credle, Jr. | ................... 248/674 |
| D296,075 S | * | 6/1988 | Jones | ........................... D8/373 |
| 4,930,696 A | | 6/1990 | Vanacker | |
| 5,188,328 A | * | 2/1993 | Thompson | ............... 248/309.2 |
| 5,417,401 A | * | 5/1995 | Thompson et al. | .......... 248/674 |
| 6,010,102 A | | 1/2000 | Dillion, Jr. | |
| 6,135,402 A | * | 10/2000 | Hatano et al. | ................ 248/207 |
| 2005/0077070 A1 | | 4/2005 | Geelhaar et al. | |
| 2008/0191108 A1 | * | 8/2008 | Hsu | ........................... 248/207 |

FOREIGN PATENT DOCUMENTS

DE 196 32 287 2/1998
WO 2004/083658 9/2004

* cited by examiner

*Primary Examiner*—Amy J Sterling
(74) *Attorney, Agent, or Firm*—Michael J. Striker

(57) ABSTRACT

In the daily live electrical devices are used in connection with a plurality of applications like telephone systems, computer systems and so on. These electrical devices should be mounted to a support to keep order within such electrical or electronic systems and thus achieve systems comprising electrical devices with a reproducible output and which are reliable and easy to maintain. A multifunctional mounting bracket 1 for an electrical device 25 is proposed comprising means for mounting 7, 8, 9, 10, 13, 14, 17, 18, 19 the electrical device 25 on a first support whereby a first mounting angle between the electrical device 25 and the first support is defined and for mounting the electrical device 25 on an alternative second support whereby a second mounting angle between the electrical device and the second support is defined, and whereby the second mounting angle is different from the first mounting angle.

17 Claims, 7 Drawing Sheets

MULTIFUNCTIONAL MOUNTING BRACKET FOR AN ELECTRICAL DEVICE

CROSS-REFERENCE TO A RELATED APPLICATION

The invention described and claimed hereinbelow is also described in European Patent Application EP No. 05109801.0 filed on Oct. 20, 2005. This German Patent Application, whose subject matter is incorporated here by reference, provides the basis for a claim of priority of invention under 35 U.S.C. 119(a)-(d).

BACKGROUND OF THE INVENTION

The invention relates to a multifunctional mounting bracket for an electrical device and more specifically to a multifunctional mounting bracket for a wireless access point device (WAP).

In daily life electrical devices are used in connection with a plurality of applications such as telephone systems, computer systems etc. Such electrical devices should be mounted to a support to keep order and thus achieve systems comprising electrical devices with a reproducible output and which are reliable and easy to maintain.

Document DE 196 32 287 A1 discloses a warning device and a method for mounting and demounting the device to a wall holder. For demounting the warning device a snap-hook of the holder is engaged in a respective recess of the warning device which must be disengaged and then a stop screw of the holder, which works as a locking device, must be unscrewed. Finally the warning device can then be separated from the holder.

Document US 2005/0077070A1 discloses an electrical device which can be attached to a holder in a vehicle. The holder is mounted to the inner side of the roof of the vehicle. The electrical device is fixed in the holder by means of a first and a second connection. The first connection is a hook, wherein the electrical device can pivot in relation to the holder, and the second connection is a locking device, wherein the electrical device can be locked.

SUMMARY OF THE INVENTION

The present invention relates to a multifunctional mounting bracket for an electrical device, especially for a wireless access point device ("WAP"). The mounting bracket comprises means for mounting the electrical device to a first support and—as an alternative—to a second support. According to the invention the mounting angle between the electrical device and the first support on the one hand side and the second support on the other hand side is different. The mounting angle is preferably defined as a pivoting angle between support and electrical device, whereby the electrical device is pivoted toward the support or away from the support. With other words, the mounting bracket comprises a first area of contact for contacting the first support and a second area of contact for contacting the second support, whereby the two areas of contact lie in different planes, especially in crossing and/or non-parallel planes.

One of the advantages of the invention lies in the fact, that the mounting bracket embodies a single and easy to use solution for mounting the electrical device in various positions and/or mounting angles. Due to the multifunctional character of the mounting bracket it is no longer necessary to sell an electrical device together with a plurality of holders in order to enable the user to mount the electrical device. By using the multifunctional mounting bracket instead of a plurality of holders no waste or loss of unused material occurs, which results in higher production costs and environmental hazards. A further advantage is that the mounting bracket can be used for stationary, quasi-stationary and/or rental purposes of the electrical device, as the electrical device can easily be mounted or demounted, whereby all mounting material needed is contained within the mounting bracket.

DESCRIPTION OF THE PREFERRED EMBODIMENTS

Figure 1:
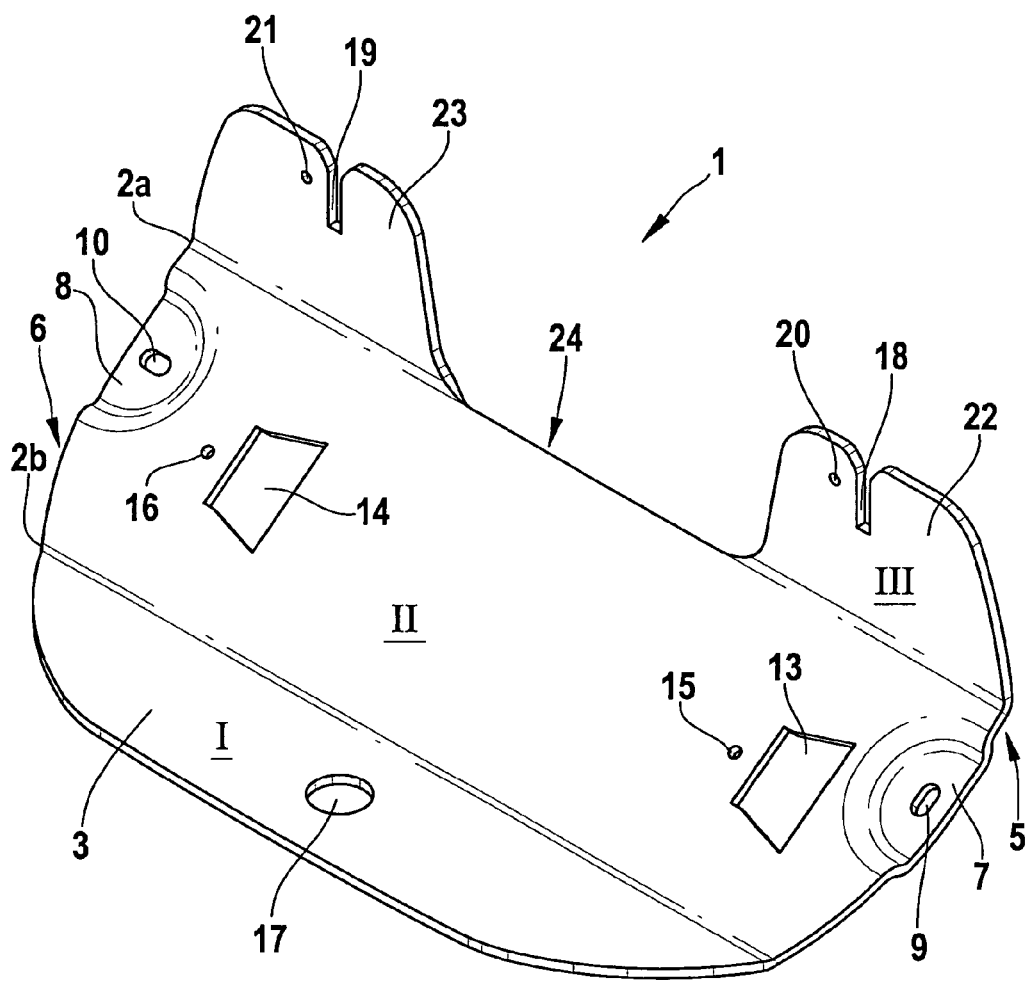
FIG. 1 a three-dimensional schematic view on a mounting bracket as an embodiment of the invention.

In a preferred embodiment of the invention the first support installation embodies a parallel or substantially parallel mounting of the electrical device to the first support and the second support installation embodies a perpendicular or substantially perpendicular mounting of the electrical device to the alternative second support. According to this embodiment the mounting device enables at least two different mounting alternatives for the electrical device, preferably so that the electrical device can be mounted on a wall or a ceiling or alternatively on a tripod. Preferably, the areas of contact of the mounting bracket as defined above are perpendicular to each other. With this embodiment the most commonly used mounting alternatives are covered by the mounting bracket.

In a further embodiment the means for mounting comprises first fastening means allowing a fastening of the mounting bracket to the first support, first connecting means for connecting the mounting bracket with the electrical device for the first support installation, second fastening means allowing an alternative fastening of the mounting bracket to the second support and second connecting means for connecting the mounting bracket with the electrical device for the second support installation. With other words, the mounting bracket comprises two pairs of mounting means whereby the first pair is adapted for the mounting of the electrical device on the first support and the second pair is adapted for mounting of the electrical device on the second support. Preferably the two pairs and/or the fastening and/or connecting means are arranged separately on the mounting bracket and are especially arranged mechanically isolated from each other. In yet another embodiment at least one of the mounting means has a double purpose, preferably so that the functions of the first and second fastening means or the functions of the first and second connecting means are realised in a combined fastening means or combined connecting means respectively.

In another preferred embodiment the mounting means, preferably all mounting means, especially the fastening and/or connecting means comprise recesses in the mounting bracket. This embodiment allows a cost-effective production of the mounting bracket as the respective mounting means can be produced by a simple stamping or punching process. Preferably all mounting means of the mounting bracket are produced by a stamping process or by a combined stamping/forming process. Further it is advantageous that the mounting bracket comprises a one-piece part, especially as a one-piece bending part.

In another further embodiment the mounting bracket has a three-sectional or tripartite shape, whereby preferably the three sections are angled to each other, and preferably are angled to each other with or substantially with a 45° angle between the sections. In this embodiment the mounting bracket shows an U-shaped or a broadened U-shaped cross-section with the second section defining the lying leg of the U. For matter of definitions the inner side of the (U-shaped) bracket will be called concave surface and the outer side will be called convex surface.

In a preferred embodiment of the invention the first fastening means are arranged at the free or open end sections of the second section of the bracket and comprise protruded areas protruding from the convex surface side whereby the plain areas function as areas of contact for example for a wall or ceiling installation of the bracket. The first fastening means further comprise recesses in the plain areas for accommodating fixing means like screws or similar. Optionally the first connecting means is realised as receptacles for mounting links such as latches snap-hooks of the electrical device arranged in the second section, whereby the receptacles are adapted for accommodating the mounting links by a sliding movement of the electrical device along a first sliding directory, which is preferably parallel to the convex surface side of the second section.

Further optionally the second fastening means is arranged in the first section, preferably in the middle of the first section, and is embodied as a round recess such as a through or clearance hole. Preferably the convex or concave surface side of the first section works as an area of contact for example for a tripod installation of the bracket.

Further optionally the second connecting means is realised in the third section and is adapted for receiving the mounting links of the electrical device by a sliding of the electrical device along a second sliding direction, which is parallel to the surface of the third section and whereby the angle between the first and second sliding direction is larger than 0° and preferably about 90°.

In a further preferred embodiment the first and second connecting means comprise holes for accommodating pins or protrusions protruding from the mounting links of the electrical device for securing the electrical device to the mounting bracket.

In a further preferred embodiment a combination of an electrical device with a mounting bracket is claimed, whereby the electrical device comprises third connecting means adapted to match with the first and second connecting means of the bracket. Preferably the third connecting means comprises mounting links snap-hooks. Alternatively the electrical device comprises receptacles for mounting links or the like protruding from the mounting bracket.

According to a preferred embodiment the mounting bracket is fully integrated in the electrical device for the first support installation, whereby only the protruded areas of the first connecting means project from the rear side of the electrical device. Preferably the second section of the mounting bracket is parallel or substantially parallel to the rear side of the electrical device. For the second support installation the second and first section projects from the rear side of the electrical device, whereby preferably the first section of the mounting bracket is arranged perpendicular or substantially perpendicular to the rear side of the electrical device.

A first step for the mounting of an electrical device is to fasten the mounting bracket on a tripod or alternatively to a wall or ceiling or the like. The positioning and fixing of the electrical device to the mounting bracket is done by means of sliding the mounting bracket into the mounting links in the rear cover of the electrical device. After placing the electrical device it can only be removed from the mounting bracket by using some force.

Finally it is emphasized that the new mounting bracket is a single, easy to use solution for mounting an electrical device like a WAP on various supports, whereby preferably the mounting bracket is adapted to be mounted to a first support like a wall or ceiling and to a second support like a tripod. A further advantage which can be achieved is that all connecting means for connecting the electrical device to the mounting bracket are provided by the bracket or the electrical device and no extra fixing material is needed which can be lost or remains unused.

FIG. 1 shows a mounting bracket 1 as an embodiment of the invention, which comprises a one-piece bending part preferably made of a thin metal band or plate as a semi-finished product. Optionally the mounting bracket 1 is coated for example by powder or lacquer.

The mounting bracket 1 comprises two parallel bending edges 2 *a* and 2 *b* defining three sections I, II, III of the mounting bracket 1, whereby section II is a central section and sections I and III are arranged as side sections. The sections I, II and III are angled to each other by an angle of approximately 45° so that the section I an III have an angle of about 90° between. Due to the bent shape the mounting bracket 1 shows a concave surface 3 and a convex surface 4 which is turned away from the viewer in FIG. 1 and thus not shown in FIG. 1.

Viewing on the concave surface side 3 the central section II shows a rectangular or oblong shape, whereby the open or free edges 5 and 6 of the section II are slightly rounded. On each of the free edges 5 and 6 fastening means realised as protruded areas 7 and 8 with respective recesses 9 and 10 are provided. The protruded areas 7 and 8 are projecting from the convex surface side 4, defining plane contact areas 11 and 12 on the convex surface side 4. Viewed on the concave surface side 3 the protruded areas show a half-round shape which are open to the free edges 5 and 6. The recesses 9 and 10 are arranged in the middle of the protruded areas 7 and 8 and are realised as oblong holes both extending parallel to each other through the mounting bracket, whereby the oblong opening of recess 9 is orientated perpendicular to the bending edges 2 *a* and 2*b* and the oblong opening of recess 10 is arranged in parallel to the bending edges 2 *a* and 2*b*. In other words the oblong openings of the recesses 9 and 10 are orientated perpendicular to each other.

The section II further comprises connecting means realised as cut-outs 13 and 14 with an identical trapezoidal shape as opening, whereby cut-outs 13 and 14 arranged on a common line parallel to bending edges 2 *a* and 2 *b* and whereby cut-out 13 is arranged near the protruded area 5 and cut-out 14 near protruded area 6. The parallel edges of the trapezoidal cut-outs 13 and 14 are arranged perpendicular to the bending edges 2 *a* and 2 *b*. Both cut-outs 13 and 14 are orientated towards a common direction, whereby the trapezoidal cut-outs 13 and 14 are positioned so that the respective shorter of the parallel edges of the cut-outs 13 and 14 head towards the common direction. Adjacent to the cut-outs 13 and 14 in the common direction and also on the common line through holes 15 and 16 are positioned.

Section I viewed from the top, i.e. viewed on the concave surface side 3, shows a flat topped half-round shape. In the middle of section II a clearance hole 17 is provided for accommodating a pin or a threaded bolt of a tripod.

Figure 3A:
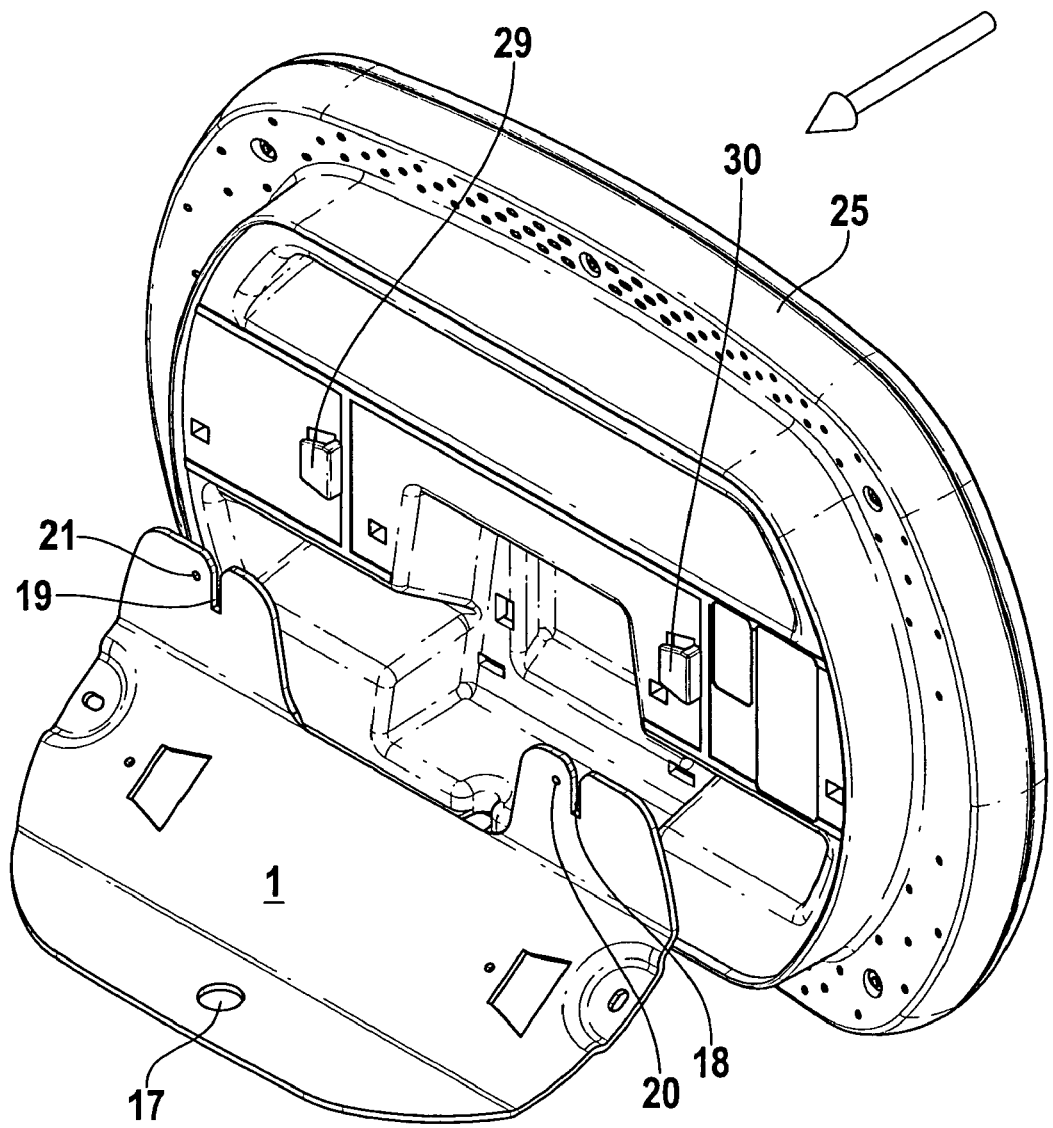
FIG. 3 a, b, c the mounting bracket of FIG. 1 during various stages of connecting with the wireless access point device of FIG. 2 for tripod installation.

Section III comprises two receptacles realised as slots 18 and 19 which extend parallel to each other and perpendicular to the bending edges 2*a* and 2*b*. The distance between the slots 18 and 19 is the same as between the two shorter edges of the cut-outs 13 and 14. Adjacent to the slots 18 and 19 through-holes 20 and 21 are positioned in an analogous manner as the through-holes 15 and 16 in relation to the cut-outs 13 and 14. Section III is sub-divided into two sub-sections 22 and 23 by means of a central cut-out 24, so that the two-subsections 22 and 23 can be bent during connecting with the WAP (FIG. 3a, b, c) independently from each other.

Figure 2A:
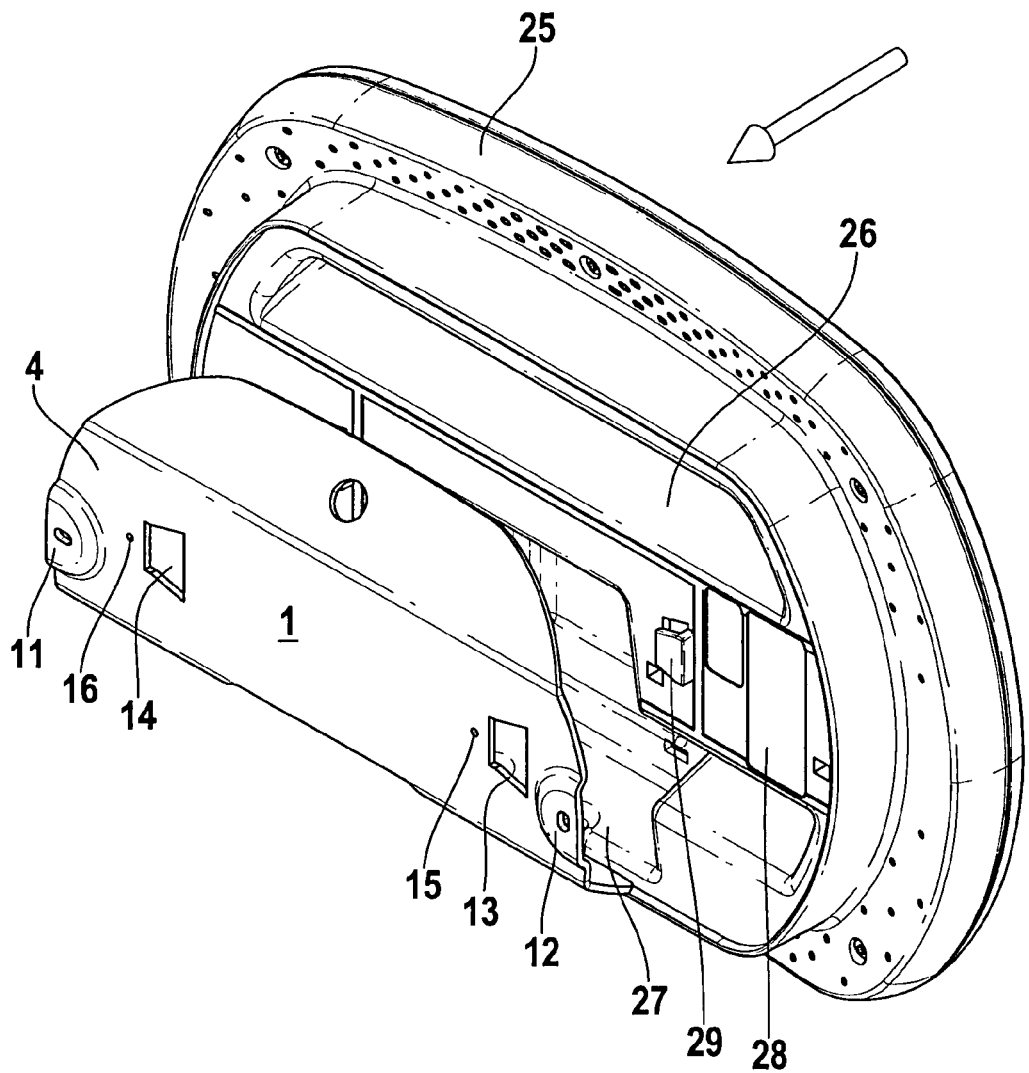
FIG. 2a, b, c the mounting bracket of FIG. 1 during various stages of connecting with a wireless access point device for wall or ceiling installation.
Figure 2B:
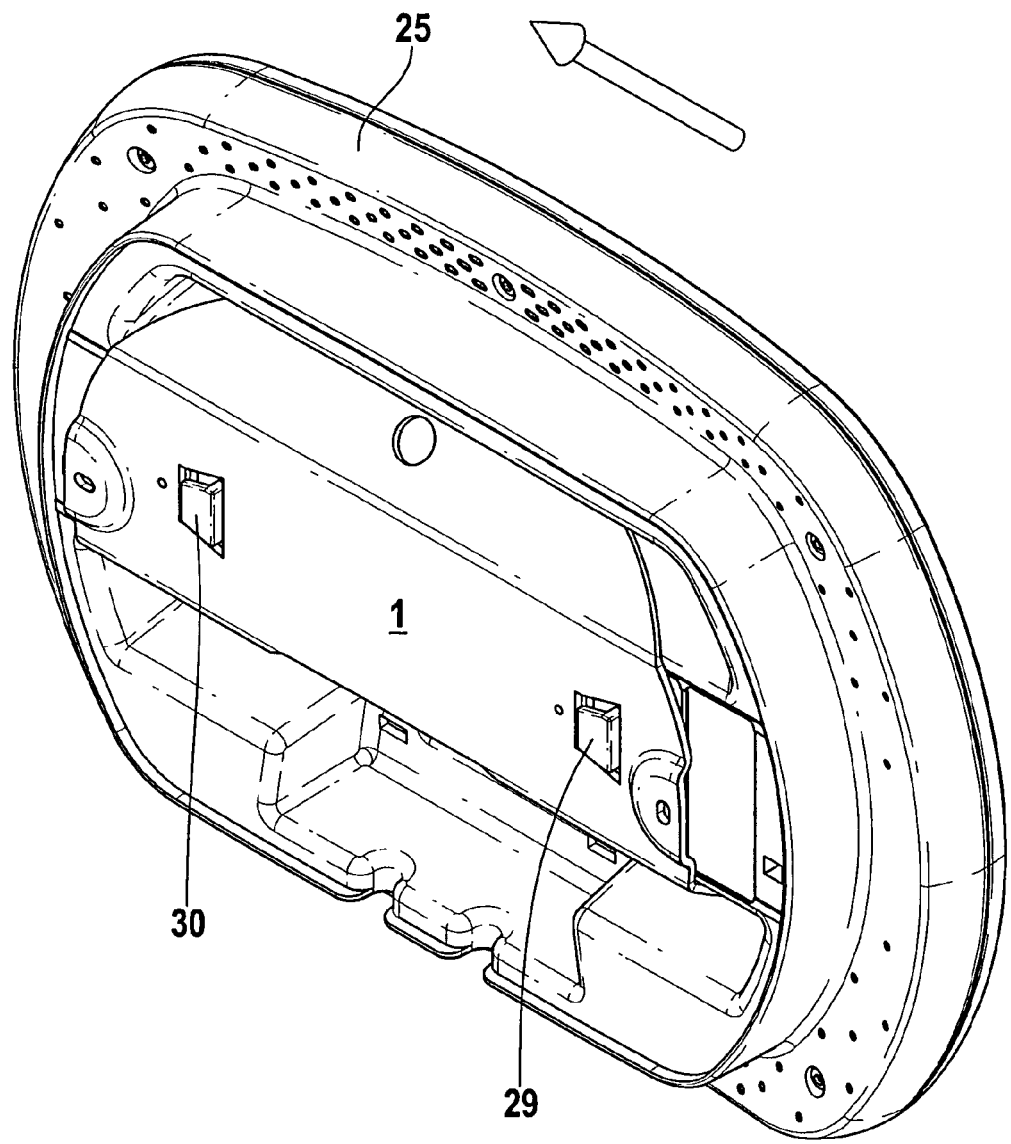
Figure 2C:
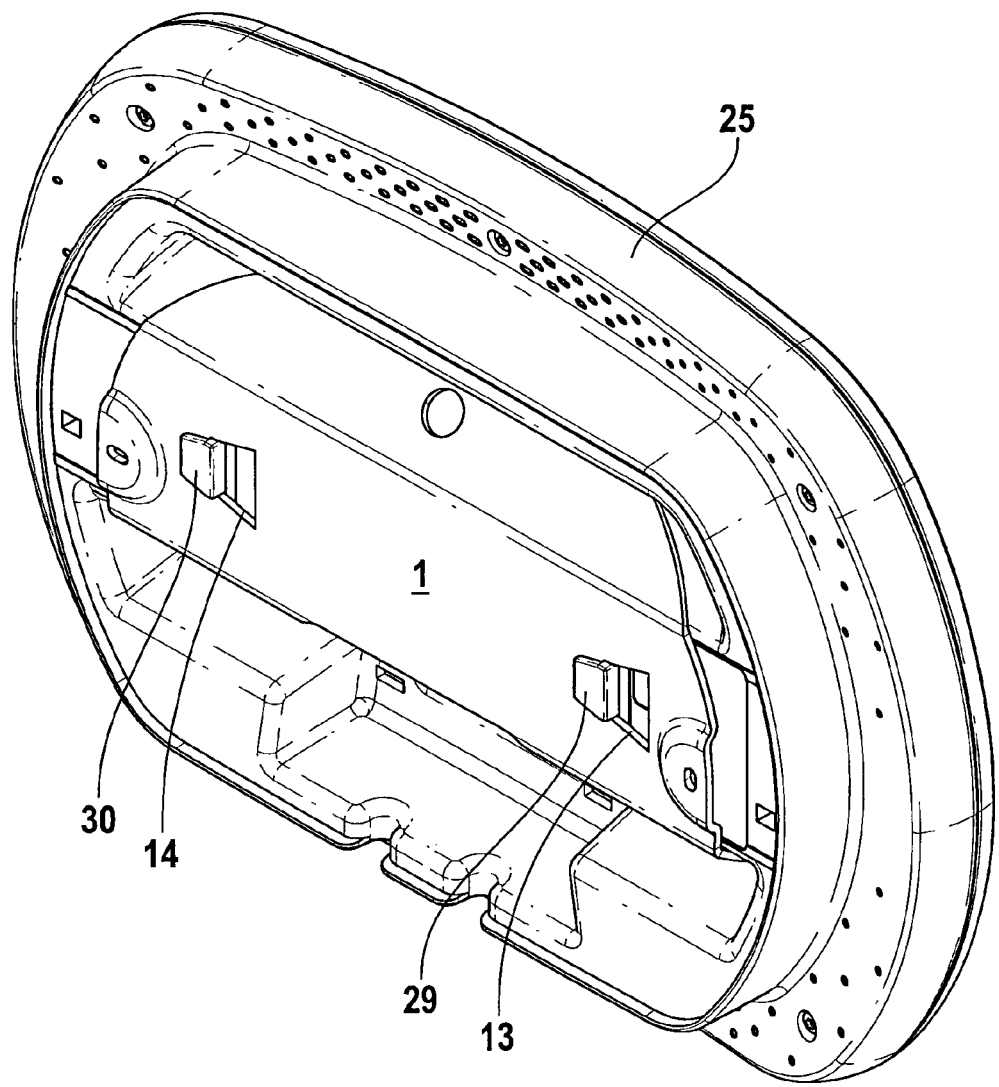

FIGS. 2a to 2c show a sequence during which the mounting bracket 1 is connected with a WAP (wireless access point device) 25.

The rear side of the WAP 25 shows a three-sectional or tripartite shape corresponding to the mounting bracket, whereby the first section 26 and the third section 27 are realised as a recess for the sections I and II respectively of the mounting bracket 1. The second section 28 comprises two snap-hooks 29 and 30 which are adapted to match with the cut-outs 13 and 14 of the mounting bracket.

In a first step the mounting bracket is fastened to a wall or a ceiling, whereby fixing means, for example screws or the like, are guided through the recesses 9 and 10 and fixed into the wall or ceiling, so that the areas of contact 11 and 12 of the mounting device are in direct contact with the wall or ceiling.

In a second step the WAP 25 is attached to the mounting bracket, whereby the snap hooks 29 and 30 are guided through the cut-outs 13 and 14 with a movement perpendicular to the convex surface side 3 of section II of the mounting device. This step is shown by the FIGS. 2a and 2b.

In a third step, which is illustrated by FIGS. 2b and 2c, the WAP 25 is slid in the above-introduced common direction, so that the snap-hooks 29 and 30 snap over the shorter edges of the cut-outs 13 and 14 thereby securing the WAP 25 to the mounting bracket 1 and thus mounting the WAP 25 to a wall or ceiling or—general speaking—to a plane support surface. In order to strengthen the snap-hook connection a pin or a protrusion is arranged on the inner side of each snap-hook 29 or 30, which snaps in the through hole 15 or 16 respectively. In the connected state as shown in FIG. 2c the mounting bracket 1 is fully integrated in the body of the WAP 25.

For removing the WAP 25 some force must be used in order to overcome the snap-hook connection by pulling or sliding the WAP 25 in opposite direction to the common direction.

Figure 3B:
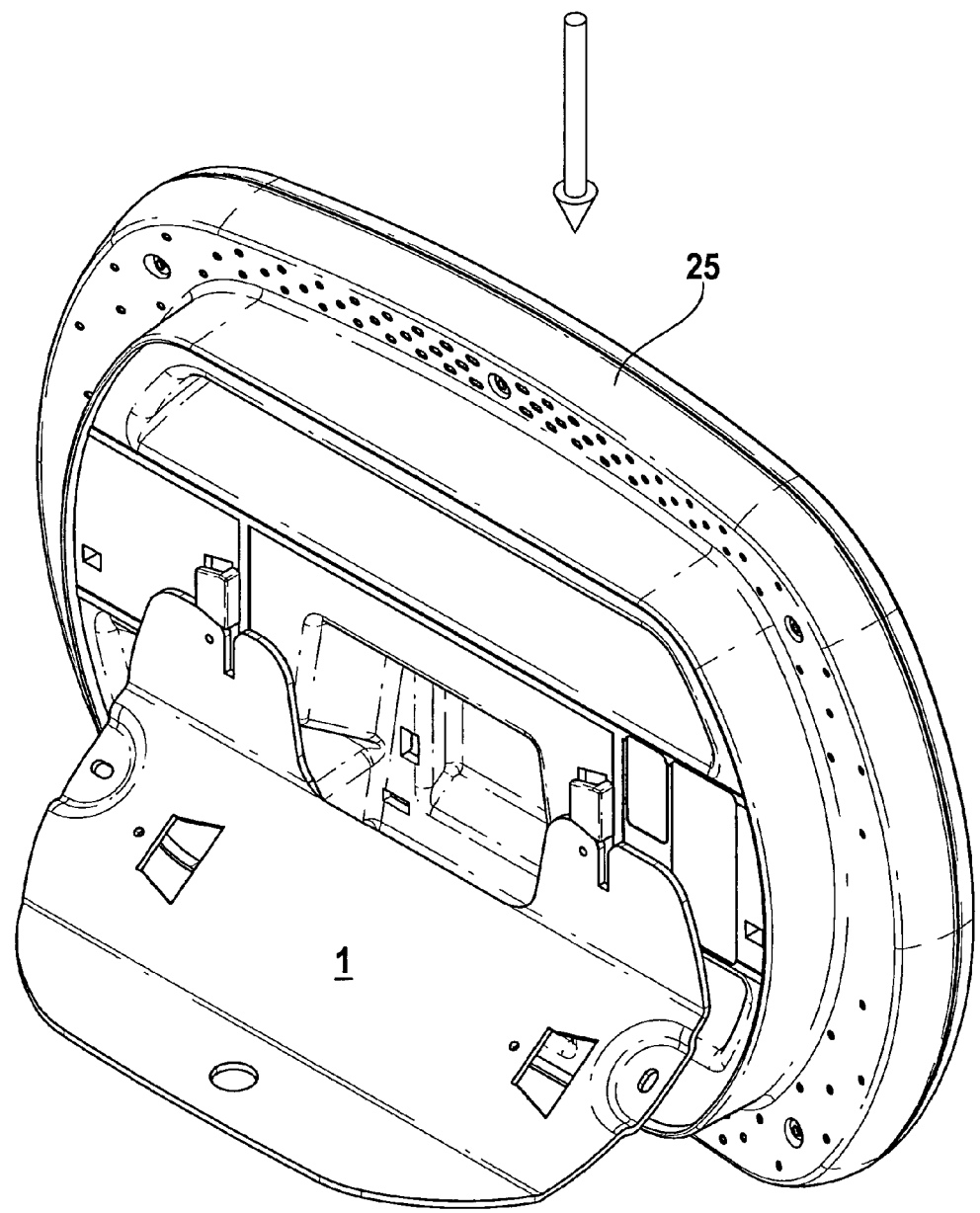

FIG. 3 a to c are a sequence to illustrate the way of connecting mounting bracket 1 and WAP 25 for a tripod installation of the WAP 25.

Figure 3C:
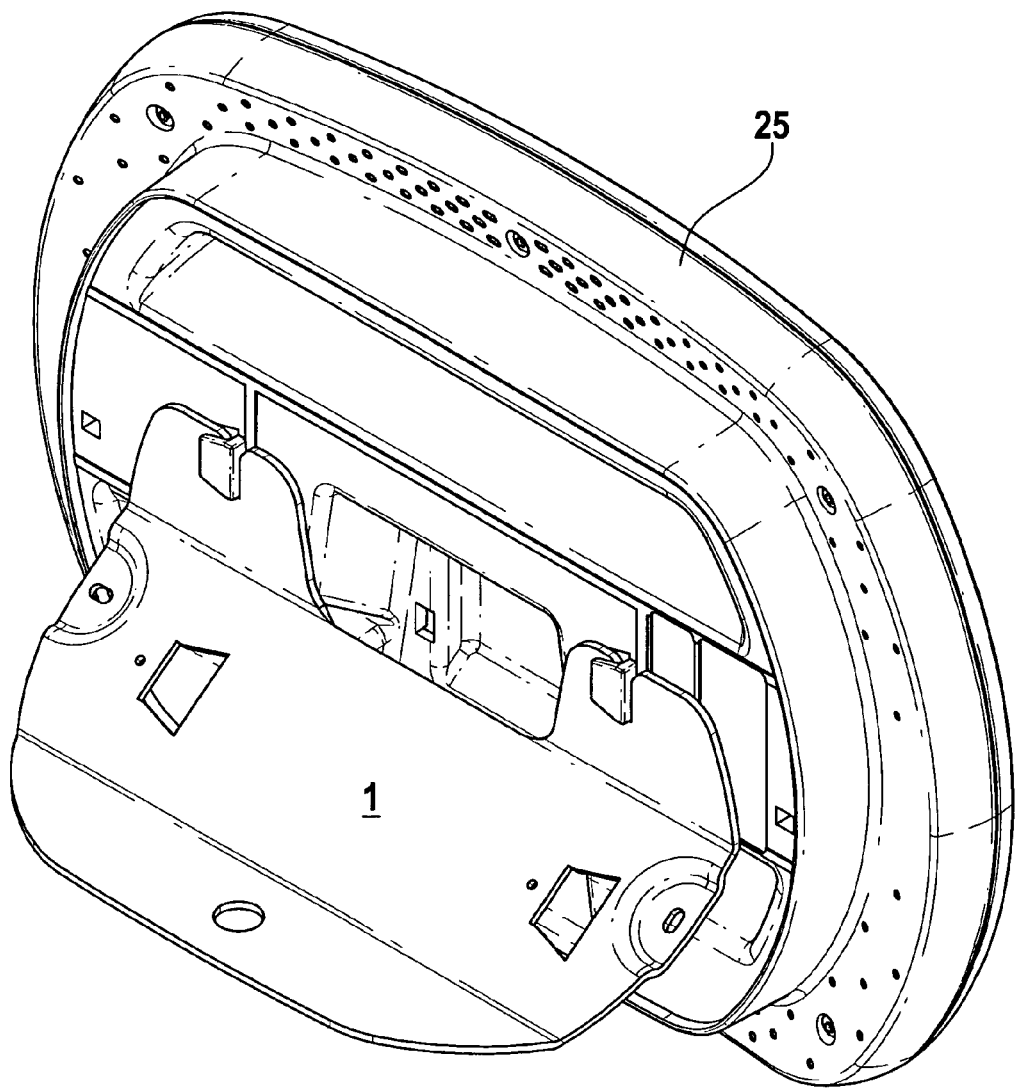

In a first step the mounting bracket 1 is fastened to a (not-shown) tripod by guiding and fixing a fixing means like a pin or threaded bolt of the tripod through the clearance hole 17. In a second step the rear side of the WAP 25 is brought in contact with the convex surface side 4 of section III so that rear side and convex surface side 4 of section III are arranged in parallel. In a third step the WAP is slid in a sliding direction parallel to the extension of the slits 18 and 19 of the mounting bracket 1, whereby the snap-hooks 29 and 30 are slid into the slits 18 and 19 so that the mounting links of the snap-hooks 29 and 30 snap over the subsections 22 and 23 respectively. Again the pins or protrusions arranged on the inner side of the snap-hooks 29 and 30 engage in the respective through holes 21 and 22 of section III. In the connected state as shown in FIG. 3c the section III of the mounting bracket 1 extends perpendicular to the rear side of the WAP 25.

As demonstrated with the FIG. 2 a to c and 3 a to c the mounting bracket 1 is a one-piece part which can be used as a holder for the WAP 25 without needing further mounting material. WAP 25 and mounting bracket 1 can be combined in two different ways: For wall or ceiling installation the WAP 25 is in contact with the concave surface 3 of the mounting bracket 1 and the wall or ceiling is in contact with areas of contact 11 and 12 on the convex surface side 4 of the mounting bracket 1. For tripod installation the rear side of the WAP 25 I is in contact with the convex surface side 4 of the mounting bracket 1 and areas of contact for contacting the tripod is provided in section I on both sides of the mounting bracket 1.

The invention claimed is:

1. A multi-functional mounting bracket for an electrical device, comprising means for mounting the electrical device on a first support and defining a first mounting angle between the electrical device and the first support, which means include first fastening means for fastening the mounting bracket to the first support and first connecting means for connecting the mounting bracket with the electrical device; and means for mounting the electrical device on an alternative second support and defining a second mounting angle between the electrical device and the second support, which means include second fastening means for fastening the mounting bracket to the second support and second connecting means for connecting the mounting bracket with the electrical device;

wherein the second mounting angle is different from the first mounting angle;

wherein the mounting bracket comprises a first section, a second section and a third section in an arrangement defining a three-sectional shape with a broadened U-shaped cross-section; and wherein said first section comprises said second fastening means, said second section comprises said first fastening means and said first connecting means and said third section comprises said second connecting means.

2. A multi-functional mounting bracket as defined in claim 1, wherein said means for mounting the electrical device on the first support is configured so as to allow a mounting of the electrical device to the first support in a manner selected from the group consisting of a parallel mounting and a substantially parallel mounting, said means for mounting the electrical device on the second support being configured so as to allow a mounting of the electrical device to the second support in a manner selected from the group consisting of a perpendicular mounting and a substantially perpendicular mounting.

3. A multi-functional bracket as defined in claim 1, wherein said first and second mounting means and said first and second connecting means are arranged separately from each other on the mounting bracket.

4. A multi-functional bracket as defined in claim 1, wherein at least one of said fastening means and at least one of said connecting means are configured as recesses in the mounting bracket.

5. A multi-functional bracket as defined in claim 3, wherein both said fastening means and both said connecting means are configured as recesses in the mounting bracket.

6. A multi-functional bracket as defined in claim 1, wherein the mounting bracket is configured as a one-piece part.

7. A multi-functional bracket as defined in claim 1, wherein the mounting bracket has a three-sectional shape, with a first section, a second section, and a third section.

8. A multi-functional bracket as defined in claim 6, wherein said first section comprises said second fastening means, said second section comprises said first fastening means and said first connecting means, and said third section comprises said second connecting means.

9. A multi-functional bracket as defined in claim 8, wherein said sections are arranged with a cross-section selected from the group consisting of a U-shaped cross-section and a broadened U-shaped cross-section, such that a lying leg is defined by said second section.

10. A multi-functional bracket as defined in claim 1, wherein said fastening means is configured as at least one protruded region defining a contact area for a wall or a ceiling with a recess for accommodating a fixing means.

11. A multi-functional bracket as defined in claim 1, wherein said second fastening means is configured as a hole for accommodating a pin or a threaded bolt of a tripod.

12. A multi-functional bracket as defined in claim 1, wherein said first connecting means is configured with at least one first receptacle for accommodating a mounting link of the electrical device, whereby said mounting link is fixed by sliding movement along a first sliding direction.

13. A multi-functional bracket as defined in claim 12, wherein said second connecting means is configured as at least one second receptacle for accommodating the mounting link of the electrical device, whereby said mounting link is fixed by sliding movement along a separate sliding direction, which his different from the first sliding direction.

14. A multi-functional bracket as defined in claim 1, wherein said second connecting means comprise holes for accommodating pins protruding from mounting links of the electrical device for securing the electrical device to the mounting bracket.

15. A multi-functional bracket as defined in claim 1, wherein the electrical device has third connecting means adapted to match with said first and second connecting means on the mounting bracket.

16. A multi-functional bracket as defined in claim 1, wherein the mounting bracket is integrated in the electrical device for a first support installation.

17. A multi-functional bracket as defined in claim 1, wherein the mounting bracket protrudes out of the electrical device for a second support installation.

* * * * *